United States Patent
Wang

(10) Patent No.: US 7,206,125 B2
(45) Date of Patent: Apr. 17, 2007

(54) INFRARED BLOCKING FILTER FOR BROADBAND OPTICAL METROLOGY

(75) Inventor: David Y Wang, Fremont, CA (US)

(73) Assignee: Therma-Wave, Inc., Fremont, CA (US)

(*) Notice: Subject to any disclaimer, the term of this patent is extended or adjusted under 35 U.S.C. 154(b) by 210 days.

(21) Appl. No.: 10/970,100

(22) Filed: Oct. 21, 2004

(65) Prior Publication Data

US 2005/0099678 A1    May 12, 2005

Related U.S. Application Data

(60) Provisional application No. 60/518,028, filed on Nov. 10, 2003.

(51) Int. Cl.
*F21V 9/06* (2006.01)
*G02B 5/26* (2006.01)

(52) U.S. Cl. .................... 359/361; 359/359

(58) Field of Classification Search ............. 359/359, 359/590
See application file for complete search history.

(56) References Cited

U.S. PATENT DOCUMENTS

| | | | |
|---|---|---|---|
| 4,747,645 A | | 5/1988 | Rudzki .................. 350/1.1 |
| 4,850,661 A | * | 7/1989 | Kawakatsu .............. 359/359 |
| 5,552,927 A | * | 9/1996 | Wheatly et al. ......... 359/359 |
| 6,415,783 B1 | * | 7/2002 | Harrison ................. 126/683 |
| 7,068,430 B1 | * | 6/2006 | Clarke et al. ........... 359/589 |
| 2004/0085642 A1 | * | 5/2004 | Condo et al. ........... 359/589 |

* cited by examiner

*Primary Examiner*—Mark A. Robinson
*Assistant Examiner*—Scott Stephens
(74) *Attorney, Agent, or Firm*—Stallman & Pollock LLP

(57) ABSTRACT

An infrared filter for an optical metrology tool includes a substrate having film stacks on opposing surfaces thereof. A first film stack can be used to reflect ultra-violet radiation and transmit radiation at non-ultraviolet wavelengths. The second film stack can be used to reflect visible to near-infrared radiation and transmit infrared radiation. The combination of film stacks can therefore extract infrared radiation from a broadband beam, with the remaining ultra-violet radiation and visible to near-infrared radiation forming the product of the filter. The filter can be used as part of the illumination or collection side optics in a broadband optical metrology tool.

28 Claims, 5 Drawing Sheets

INFRARED BLOCKING FILTER FOR BROADBAND OPTICAL METROLOGY

CLAIM OF PRIORITY

This application claims priority to U.S. Provisional Patent Application No. 60/518,028, entitled "INFRARED BLOCKING FILTER FOR BROADBAND OPTICAL METROLOGY," filed Nov. 10, 2003, which is hereby incorporated herein by reference.

TECHNICAL FIELD OF THE INVENTION

The present invention relates to optical devices and methods used to non-destructively evaluate semiconductor wafers.

BACKGROUND

There is a great need in industries such as the semiconductor industry for sensitive metrology equipment that can provide high resolution and non-contact evaluation capabilities, particularly as the geometries of devices in these industries continue to shrink. Manufacturers have increasingly turned to optical metrology techniques, such as ellipsometry and reflectometry, which typically operate by illuminating a sample with a probe beam of electromagnetic radiation and then detecting and analyzing the reflected and/or transmitted energy. The probe beam can consist of polarized or unpolarized radiation, and can include one or more wavelengths of radiation in any of the appropriate radiation bands as known in the art. Ellipsometry techniques typically measure changes in the polarization state of the probe beam after interacting with the sample, while reflectometry techniques measure changes in the magnitude of the reflected probe beam. Scatterometry is a specific type of optical metrology that typically is used to measure diffraction, or optical scattering, of the probe beam due to the structural geometry of the sample, whereby details of the structure causing the diffraction can be determined.

Various optical techniques have been used to perform optical scatterometry. These include broadband spectroscopy (BBS), described in U.S. Pat. Nos. 5,607,800, 5,867,276, and 5,963,329; spectral ellipsometry (SE), described in U.S. Pat. No. 5,739,909; single-wavelength optical scattering (SWOS), described in U.S. Pat. No. 5,889,593; and spectral and single-wavelength beam profile reflectance (BPR) and beam profile ellipsometry (BPE), described in U.S. Pat. No. 6,429,943. Scatterometry in these cases generally refers to the collection of optical response information in the form of diffraction orders produced by periodic structures, such as gratings on a wafer. Any of these measurement technologies, such as single-wavelength laser BPR or BPE technologies, also can be used to obtain critical dimension (CD) measurements on non-periodic structures, such as isolated lines or isolated vias and mesas. The above cited patents and patent applications, as well as PCT Application No. WO 03/009063, U.S. application Ser. No. 2002/0158193, U.S. application Ser. No. 2003/0147086, U.S. application Ser. No. 2001/0051856 A1, PCT Application No. WO 01/55669 and PCT Application No. WO 01/97280, are each hereby incorporated herein by reference.

For optical metrology systems utilizing broadband light, the outputs of two or more light sources or bulbs are often combined in order to obtain a probe beam with suitable broadband characteristics. For example, three lamps can be used to generate a probe beam that spans a wavelength range from about 185 nm to about 900 nm. A tungsten lamp is often used due to the associated output range from the visible to near infrared spectrum, a deuterium bulb is often used for the associated deep ultraviolet (DUV) output, and a xenon bulb is often used for the associated deep ultraviolet to near infrared output spectrum.

One problem with using light sources such as those listed above is that each light source can generate undesirable thermal radiation outside the intended wavelength band. This undesirable radiation can contaminate the desired in-band signals at the detector, such that some error is introduced into the measurements. In order to minimize the amount of undesirable thermal radiation, a heat-blocking filter can be used at any appropriate point between the light source and the detector. For instance, a heat-blocking filter can be used that blocks all undesirable out-of-band infrared light, without blocking desirable in-band signals over the wavelength range of ultraviolet to near-infrared light.

Many existing systems have utilized various heat-blocking filters. For example, a laser notch filter that transmits over a narrow pass band and blocks infrared light can be used in a laser system. Other common filters include a band pass filter that transmits over the visible spectrum and blocks infrared light, as well as filter glass that transmits in the visible spectrum and cuts off in the infrared spectrum. None of these existing filters is entirely satisfactory for all applications, as these filters cannot provide for high transmission and/or high reflection over a large wavelength range, such as a range spanning 185 nm to 900 nm, which also blocks or removes infrared heat beyond 900 nm.

DETAILED DESCRIPTION

Systems and methods in accordance with embodiments of the present invention overcome deficiencies in existing optical metrology systems by providing an infrared blocking filter for optical beams. These filters can be used, for example, to reduce the infrared content of optical beams used in broadband optical metrology tools.

Figure 1:
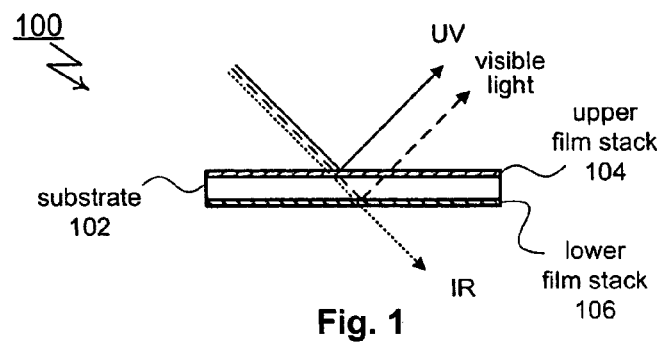
FIG. 1 shows an infrared blocking filter that can be used in accordance with one embodiment of the present invention.

FIG. 1 shows one such infrared filter 100, which includes a substrate 102 fabricated from a material, such as fused silica, that is transmissive over a broad spectral range, such as from the near-UV through the infrared spectrum. The substrate can be made of any other appropriate material, such as fused quartz, and can have any appropriate thickness. The substrate 102 is shown to be a horizontally-oriented substrate having an upper film stack 104 and a lower film stack 106 disposed on opposing faces, although it should be recognized that this orientation and nomenclature is used simply for convenience and that other orientations of film stacks on opposing surfaces of a substrate can be used as would be understood to one of ordinary skill in the art.

The upper film stack 104 can be designed and/or selected to provide a relatively high reflectivity across wavelengths in the UV spectrum, and relatively high transmissivity for visible and longer wavelengths. As shown in FIG. 1, such a selection allows visible to infrared light to pass through upper film stack 104 while any UV light contained in the light beam is reflected therefrom. The material and design of the upper film stack 104 also can be selected to incorporate dielectric films and/or have minimal absorption and scatter, such that visible to infrared light transmitted through the stack maintains at least 70% of the initial intensity, for example, as the beam passes through the upper film stack 104. Similarly, the reflected UV light can retain at least 70% of the initial intensity, for example, as the UV portion of the beam is reflected by the upper film stack 104. In one combination of substrate and upper and lower film stacks, at least 50% of the light is reflected over a wavelength range of $\lambda_o$ to at least $2.3\lambda_o$, such that $\lambda_o$ is the shortest wavelength reflected by the upper film stack.

In order to obtain the desired combination of high transmissivity for visible to infrared light and high reflectivity for UV light, the upper film stack 104 can include alternating layers of relatively high and relatively low refractive index materials. These layers can include any appropriate materials, such as silicon dioxide ($SiO_2$) for the low refractive index layers and Scandium oxide ($Sc_2O_3$) for the high refractive index layers. For each application, a determination can be made as to how many layers are needed to produce acceptable and/or optimal results. The total number of layers typically is around 20 to 50 layers. Each layer can have an appropriate thickness, such as a thickness on the order of about a quarter-wave optical thickness. While a quarter-wave optical thickness can be the nominal value of layers for many embodiments, it is well known in the art that these thicknesses can be varied by layer in order to obtain the desired performance curve. The thicknesses and number of layers can be adjusted to obtain reasonable performance at a reasonable cost, as adding layers can increase the cost of the device. To reduce reflections in the visible and IR bands, the thickness of individual layers in the upper film stack 104 can be modified. In practice, it has been found that one or more of the outer layers on each side of upper film stack 104 can be optimized in this fashion to improve results. Different embodiments can use different numbers of layers, different layer thicknesses, and/or materials.

The combination of layers in the upper film stack described with respect to FIG. 1 can provide good reflectivity in the ultraviolet range above about 215 nm. To increase this range to include shorter wavelengths, additional layers can be added at the top surface, or non-substrate side, of the dielectric film stack 104. For example, fourteen additional alternating layers can be added using magnesium fluoride ($MgF_2$) for the low refractive index layers and aluminum oxide ($Al_2O_3$) for the high refractive index layers. Adding these additional layers can provide good reflectivity in the ultraviolet range above 190 nm.

There are many other materials that can be used for the alternating high and low refractive index materials, either for the initial layers of the stack or for any additional layers. For example, materials such as Neodymium Fluoride ($NdF_3$), Gadolinium Fluoride ($GdF_3$), Lanthanum Fluoride ($LaF_3$), Aluminum Oxide ($Al_2O_3$), Praseodymium Fluoride ($PrF_3$) and Thorium Fluoride ($ThF_4$) can be used for the high refractive index layers. Materials such as Aluminum Fluoride ($AlF_3$), Magnesium Fluoride ($MgF_2$), Silicon Dioxide ($SiO_2$), Lithium Fluoride (LiF), and Cryolite ($Na_3AlF_6$) can be used for the low refractive index layers. Additional information relating to such a film stack 104 is disclosed in U.S. patent application Ser. No. 2003/0169425, which is hereby incorporated herein by reference. In another embodiment, the upper film stack 104 can comprise a dichroic mirror having one or more layers. Each layer in the dichroic mirror can reflect ultraviolet radiation within a specific range, while passing radiation at other wavelengths.

The lower film stack 106 in FIG. 1 can be selected and/or designed to act as a long pass filter providing relatively high transmissivity in the IR wavelengths and relatively high reflectivity across the visible and near-IR wavelengths. As shown in FIG. 1, such a selection allows infrared light to pass through lower film stack 106 while any visible light contained in the light beam is reflected therefrom. The material and design of the lower film stack 106 also can be selected to have minimal absorption and scatter, such that visible light reflected therefrom maintains at least 70% of the initial intensity. Similarly, the transmitted IR light can retain at least 70% of the remaining intensity, for example, as the IR portion of the beam is transmitted by the lower film stack 106. As with the upper film stack, the lower film stack 106 can include alternating layers of relatively high and relatively low refractive index materials in order to obtain the desired combination of transmissivity for IR light and reflectivity for visible light. For each application, a determination can be made as to the number and thickness(es) of layers used. Different embodiments can use different numbers of layers, different layer thicknesses, and/or materials. A beam dump (not shown) or other optical collection device can be used to capture the infrared light transmitted by the lower film stack 106.

Figure 2:
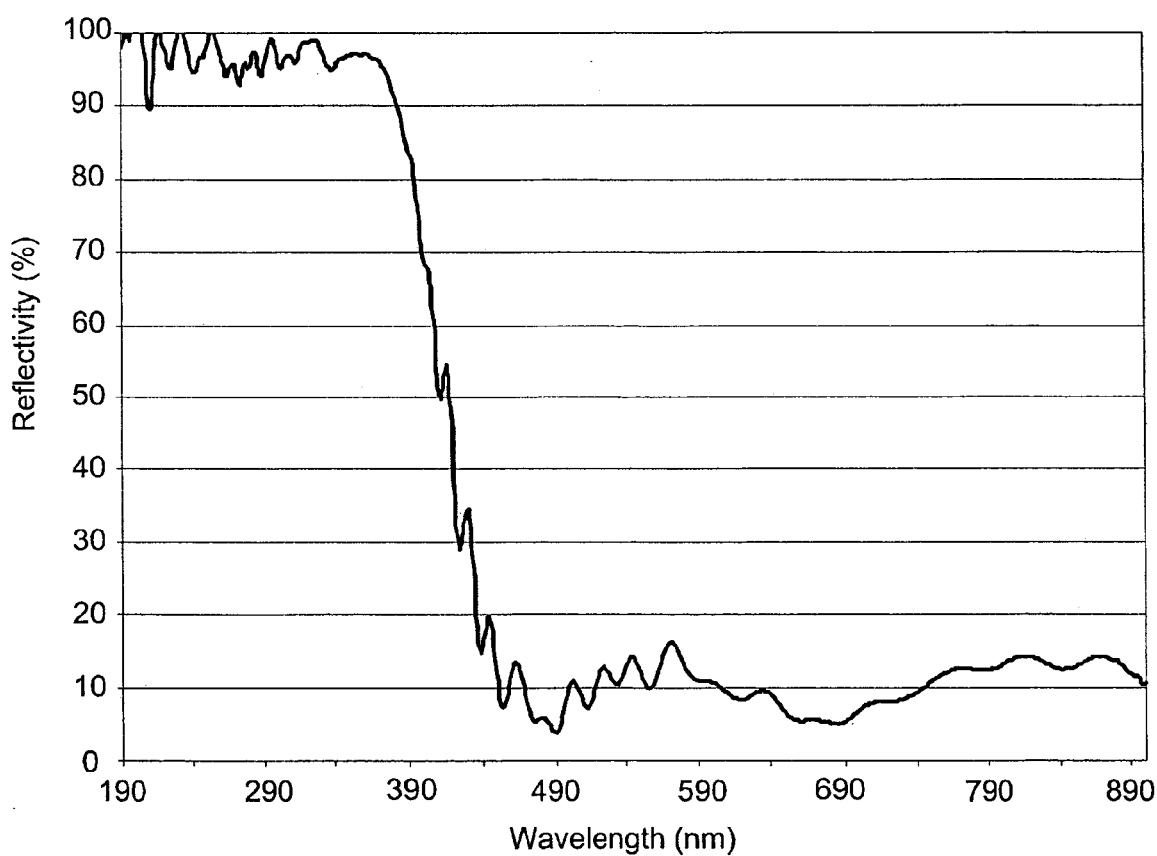
FIG. 2 is a plot showing reflectivity as a function of wavelength for the upper film stack of the infrared blocking filter of FIG. 1.
Figure 3:
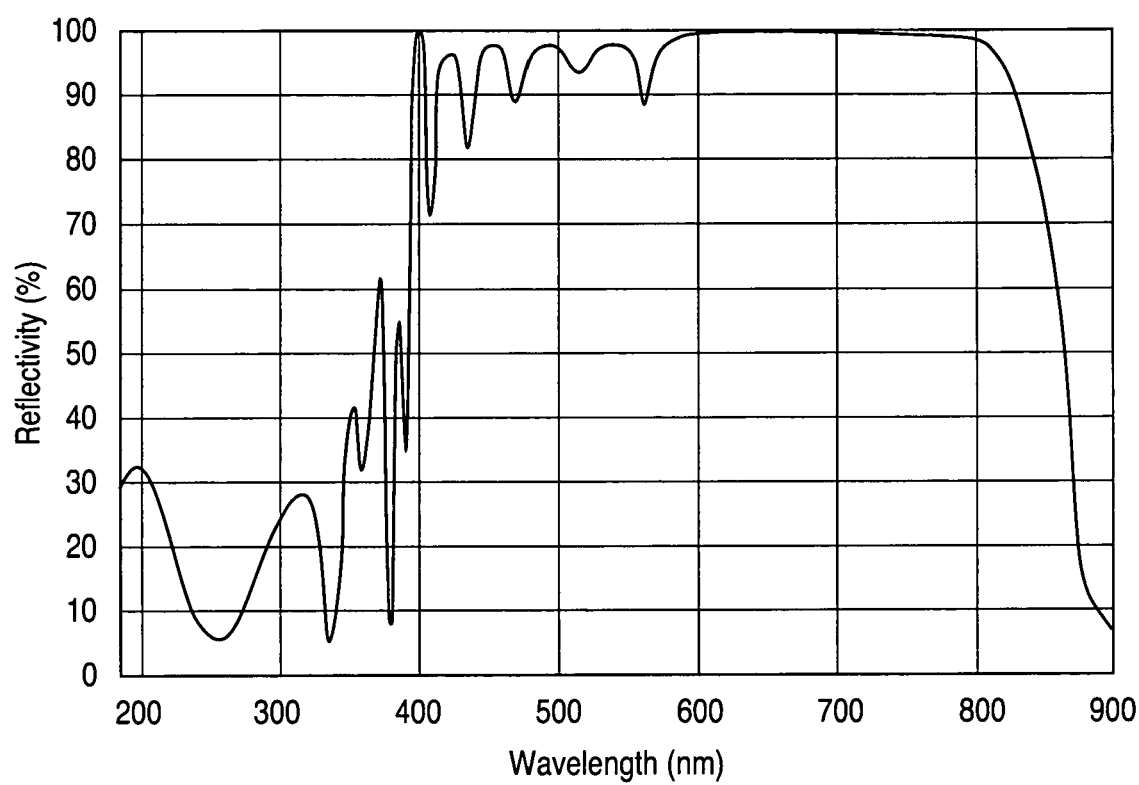
FIG. 3 is a plot showing reflectivity as a function of wavelength for the lower film stack of the infrared blocking filter of FIG. 1.

FIG. 2 shows the reflectivity 200 of an exemplary upper film stack (such as stack 104 in FIG. 1) as a function of wavelength. As can be seen in the plot, the reflectivity transitions rapidly in the 370 nm region. Longer wavelengths, such as wavelengths in the visible to near infrared spectrum, are transmitted by the film stack, while shorter wavelengths, such as wavelengths in the UV spectrum, are reflected by the stack. The reflectivity 300 of an exemplary lower film stack (such as film stack 106 in FIG. 1) is plotted as a function of wavelength in FIG. 3. As shown, reflectivity can transition rapidly in the region around 820 nm and above. Longer wavelengths (i.e., infrared) are transmitted by the lower film stack while shorter wavelengths (i.e., visible to near infrared) are reflected.

In operation, upper film stack 104 reflects DUV to UV light, and substantially transmits visible to infrared light through substrate 102 to lower film stack 106. Lower film stack 106 reflects visible to near-infrared light and transmits infrared light. The visible to near-infrared light reflected by lower film stack 106 can return through substrate 102 and upper film stack 104. Overlapping portions of the reflected DUV to UV and visible to near-infrared light form the product of IR filter 100. An aperture (not shown) can be used to capture light reflected from both the upper and lower film stacks. Additional mixing of the DUV to UV and visible to near infrared light can be accomplished through the use of a beam homogenizer (not shown) positioned to follow IR-blocking filter 100.

Figure 4:
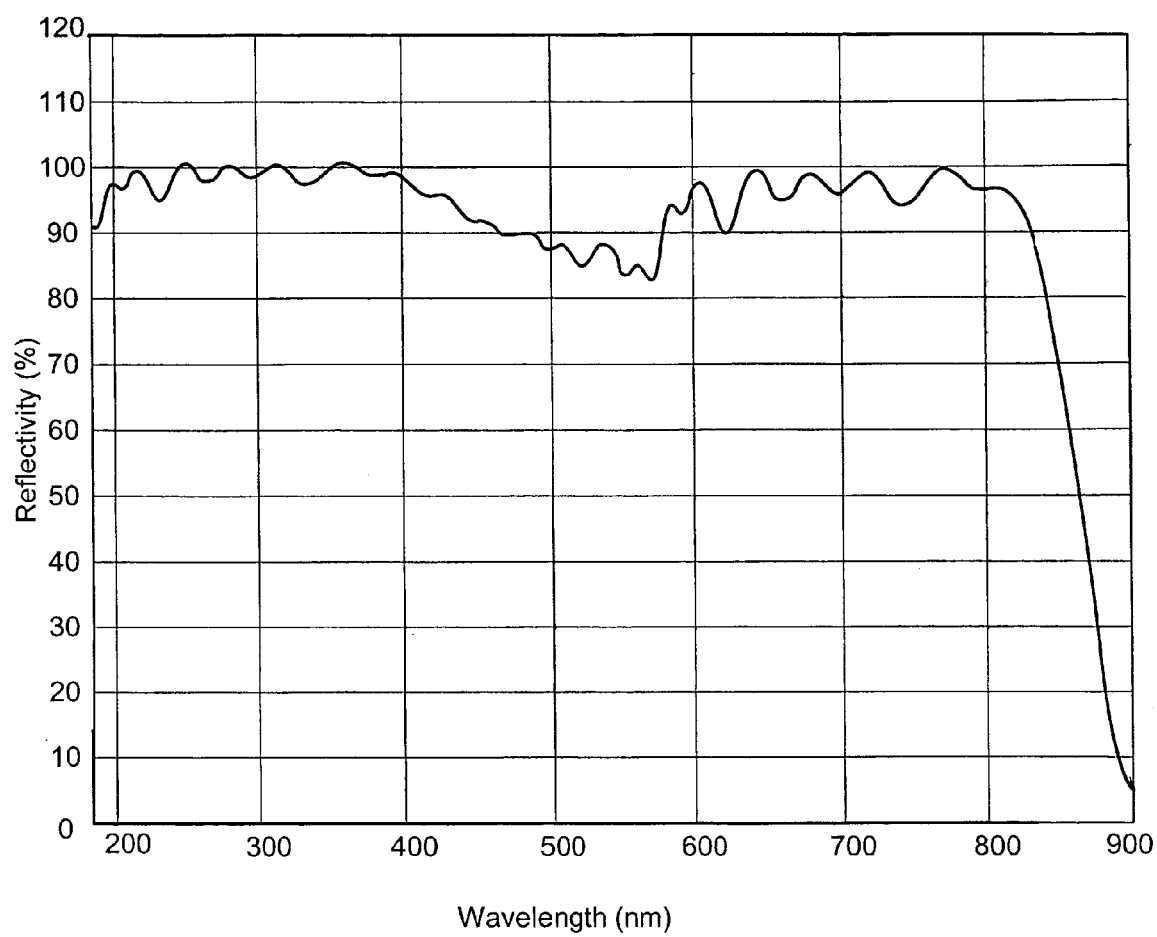
FIG. 4 is a plot showing reflectivity as a function of wavelength for the infrared blocking filter of FIG. 1.

The reflectivity of an exemplary IR-blocking filter as described above is plotted as a function of wavelength in FIG. 4. As can be seen, the reflectivity curve 400 transitions rapidly in the 820 nm region. Longer wavelengths are transmitted while shorter wavelengths (i.e., DUV to near-infrared) are reflected as discussed above. When using the DUV and visible filters discussed above, the primary reflectance bands are typically between about 190 nm and 410 mm for the UV band and between about 400 nm and 820 nm for the visible band. The substrate typically is 80% or more transmissive over a wavelength range of approximately 350 nm to 1200 nm. In such an embodiment, the high reflectivity region can be extended to include the entire range between the lower UV range of about 190 nm to the higher visible range of about 820 nm. This can be accomplished by selecting a lower film stack 106, for example, that produces high reflectivity from around 400 nm to around 820 nm. The throughput of such a blocking filter can produce at least a 70% reflectivity in the UV to visible range, such as from about 190 nm to about 820 nm, and at most a 30% reflectivity in the infrared range, such as from about 900 nm to about 1200 nm.

In one particular example for a xenon-source IR-blocking filter, the full wavelength range of the filter is about 220 nm to about 840 nm, with the upper film stack reflecting wavelengths in the 220 nm to 440 nm range and the lower film stack reflecting wavelengths in the 420 nm to 840 nm range. Transmission for such a filter is considered to be about 880 nm to 1200 nm and above.

Figure 5:
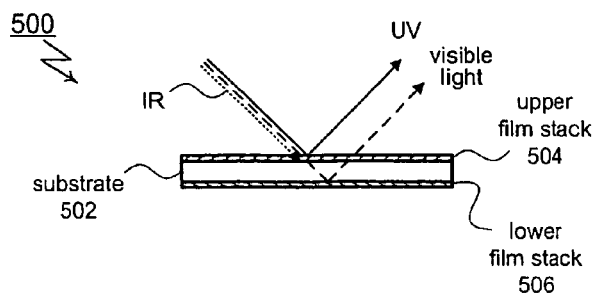
FIGS. 5–7 are diagrams showing infrared blocking filters that can be used in accordance with additional embodiments of the present invention.

An IR-blocking filter 500 in accordance with another embodiment of the present invention is shown in the example of FIG. 5. This exemplary IR filter 500 includes a substrate 502 fabricated from an infrared absorbing material, such as Schott KG filter glass available from SCHOTT North America, Inc., of Elmsford, N.Y. The substrate 502 has film stacks on opposing planar side, shown here as an upper film stack 504 and a lower film stack 506. The substrate 502 can provide relatively high transmissivity in the visible and near-IR wavelengths, and can be substantially opaque to IR wavelengths. To provide the required opacity throughout the IR range, the substrate 502 can be constructed using appropriate infrared absorbing filter glasses or multiple layers. Each layer can be selected to absorb infrared radiation within a specific range, while transmitting radiation at other wavelength ranges. Alternatively, each layer can be selected to pass infrared radiation within a specific range, while reflecting radiation at other wavelength ranges. The upper film stack 504 can be structurally similar to the upper film stack of FIG. 1, and can be designed to provide relatively high reflectivity across UV wavelengths and relatively high transmissivity in the visible and longer wavelengths. The lower film stack 506 can include one or more layers, and can be designed to be reflective in the visible to near-infrared light ranges, and transmissive or reflective at other wavelength ranges.

In operation, the upper film stack 504 can reflect DUV to UV light, and can transmit visible to infrared light through to the substrate 502. The substrate 502 can absorb infrared light and pass visible to near-infrared light on to the lower film stack 506. The visible to near-infrared light reflected by the lower film stack 506 can return through the substrate 502 and upper film stack 504. Overlapping portions of the reflected DUV to UV and visible to near infrared light can form the product of this IR-blocking filter 500. Additional mixing of the DUV to UV and visible to near-infrared light can be accomplished through the use of a beam homogenizer (not shown) positioned to follow the IR filter 500 (after light reflection).

Figure 6:
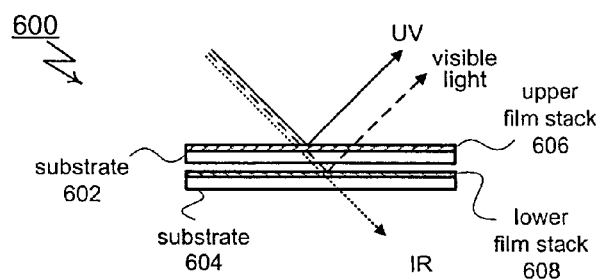

An IR-blocking filter 600 in accordance with another embodiment is shown in FIG. 6. In this embodiment, the filter 600 is constructed using at least two substrates 602, 604. A first substrate 602 provides a foundation for an upper film stack 606, and a second substrate 604 provides a foundation for a lower film stack 608. The substrates 602, 604 can be constructed from the same material, or from different materials, and can be of the same or differing thicknesses. The substrates can be positioned adjacent to each other (but for any intervening stack layers) or separated by a predetermined distance.

In the embodiment shown in FIG. 6, the upper film stack 606 is placed on the "upper" side of the first substrate 602, or the side opposite the second substrate. In this case, the upper stack 606 reflects the DUV to UV light and transmits the visible to IR light through the first substrate 602.

In another embodiment, the upper film stack can be placed on the "lower" side of the substrate 602, or the side facing the second substrate. In this case, substantially all the light that is incident upon the first substrate 602 is transmitted through the first substrate 602 to the upper stack 606. The upper stack 606 then reflects the DUV to UV light back through the first substrate 602 and transmits the visible to IR light to the second substrate 604.

The transmitted light then can be incident upon a lower film stack 608 on the second substrate 604. The lower film stack 608 can be in contact with, or separated a distance from, the upper film stack 606 when the upper film stack is on the lower side of the first substrate. The lower film stack 608 can transmit the IR light, and can reflect the visible to near-IR light back through the upper film stack 606 and first substrate 602. In the case where the upper film stack 606 is in contact with the lower film stack 608, the reflected light beams from the upper film stack 606 and lower film stack 608 can be substantially coincident.

In another embodiment, the lower film stack 608 can be on the "lower" side of the second substrate 604. In this embodiment, the light transmitted through the first substrate 602 and upper film stack 606 will pass through the second substrate 604 to the lower film stack 608, which will substantially transmit infrared radiation and substantially reflect visible to near-infrared light.

It can be seen that different arrangements of the filter 600 of FIG. 6 can include the upper and lower film stacks on adjacent sides of the first and second substrates, opposing sides of the substrates, or both stacks being on upper or lower sides of the substrates. For each of these variations, the upper and lower substrates (and any film stacks thereon) can be in contact or separated by an appropriate distance. In other embodiments, it is possible to have additional layers on the first and/or second substrates, which can be on the same side as, or opposite, the corresponding film stack.

The materials and dimensions for the upper and lower stacks, as well as the substrates, can be selected as described above. For instance, in one embodiment multiple lower film stacks are used, wherein each succeeding film stack is selected to transmit within a specific range and reflect a different wavelength range. In another embodiment, multiple "second" substrates are used, with each second substrate having at least one lower film stack thereon. Each succeeding second substrate and lower film stack then can be selected to transmit within a specific range and reflect a different wavelength range. The use of multiple second substrates and lower film stacks can extend the dynamic range of the IR-blocking filter.

Figure 7:
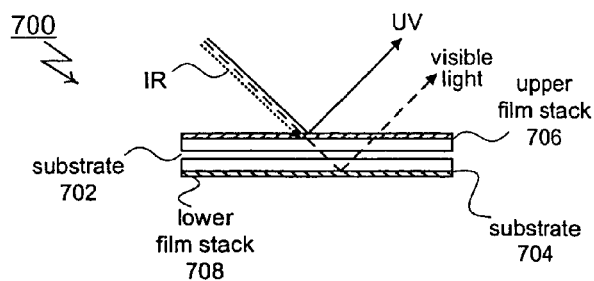

FIG. 7 shows another embodiment 700 using first and second substrates 702, 704. In this embodiment, however, at least one of the first and second substrates is IR-absorbing. In this way, virtually no infrared light is transmitted through the filter. In the arrangement of FIG. 7, any IR light transmitted by the upper film stack 706 is absorbed by either the first substrate 702 or second substrate 704 (or both) before reaching the lower film stack 708, which substantially reflects the visible to near-infrared radiation. As discussed with respect to the embodiment of FIG. 6, different arrangements can include the upper and lower film stacks on adjacent or opposing sides, or both stacks being on upper or lower sides of the substrates. The upper and lower substrates (and any film stacks thereon) can be in contact or separated by an appropriate distance, and additional layers can be included on the first and/or second substrates, which can be on the same side as, or opposite, the corresponding film stack. The materials and dimensions for the upper and lower stacks, as well as the substrates, can be selected as described above.

The wavelength filters described with respect to FIGS. 1 and 5–7 can be used in any of a wide variety of optical metrology systems, such as any broadband metrology system where out-of-band infrared radiation is undesirable. Examples of such systems include thin film measurement technologies such as spectroscopic ellipsometry (SE), broadband reflectometry (BBR), and spectroscopic scatterometry (SS), as discussed above.

Figure 8:
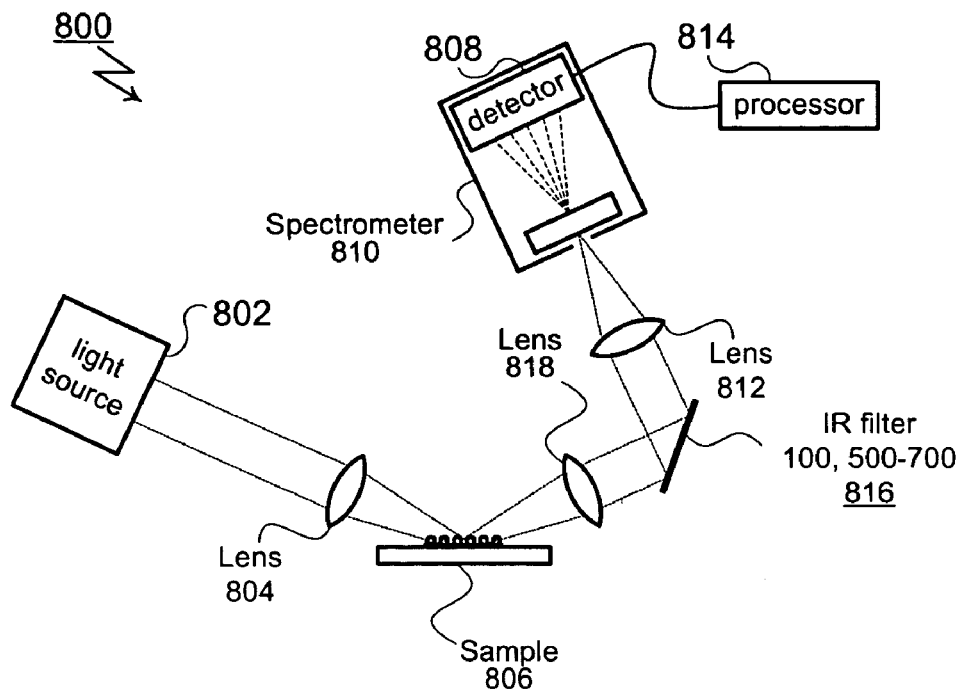
FIG. 8 is a block diagram of an optical metrology tool includes an infrared blocking filter as part of the collection side optics in accordance with one embodiment of the present invention.

FIG. 8 shows an exemplary metrology system 800 in accordance with one embodiment of the present invention. A lens 804 can be used to project light from the light source 802 to a uniform, small-spot illumination at the sample 806. An aperture stop and a field stop (both not shown) can be used between the light source 802 and the sample 806 to further control the divergence and size of the illumination beam from the light source.

Another lens 812 can collect the light reflected from the sample 806 and focus the reflected light to a spectrometer 810. The optics of the spectrometer can disperse and focus the light onto a detector 808. The detector can provide an output signal to a processor 814 in response to the receiving of the reflected illumination, the signal being indicative of a measure of intensity of the detected illumination. The processor 814 can use the output signal to determine at least one characteristic of the sample 806.

As shown in the embodiment of FIG. 8, an IR-blocking filter 816 as described herein can be positioned in the metrology system 800 as part of the optics between the sample 806 and the detector 808. Here, the IR-blocking filter can reflect the DUV to near-IR light off the sample 806 as described above, while transmitting or absorbing out-of-band IR light off the sample 806. In this embodiment, the desirable DUV to near-IR light reaches the detector 808, while the out-of-band IR light is rejected.

Figure 9:
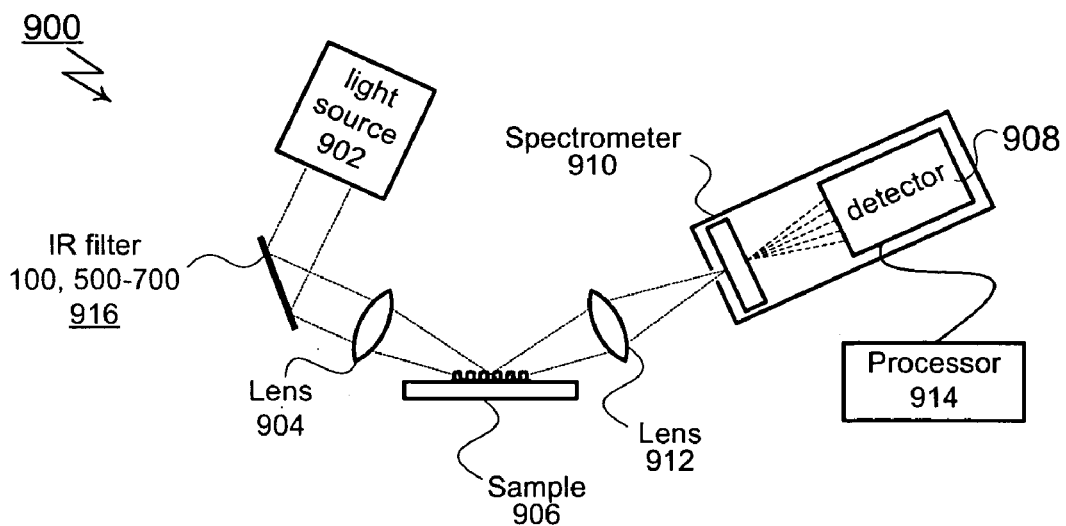
FIG. 9 is a block diagram of an optical metrology tool that includes an infrared blocking filter as part of the illumination side optics in accordance with one embodiment of the present invention.

As shown in the embodiment of FIG. 9, an IR filter 916 also can be positioned in a metrology system 900 between the light source 902 and the sample 906. This position of the filter 916 allows the out-of-band IR light to be rejected before the light is incident on the sample 906. This can be useful where the sample is susceptible to damage due to heat and/or IR radiation contained in the illumination from the light source 902. The reflected light can be collected by a lens 912 and focused onto a spectrometer 910 and detector 908 capable of providing an output signal to the processor 914.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. An infrared filter for an optical metrology tool, comprising:
    a substrate being substantially planar and substantially transmissive to radiation in the visible to infrared spectrum;
    a first film stack positioned on a first substantially planar surface of the substrate, the first film stack configured to substantially reflect at least 70% of radiation in the ultra-violet spectrum over a range of approximately 190 nm to 300 nm and substantially transmit radiation in the visible to infrared spectrum; and
    a second film stack positioned opposite the first film stack on a second substantially planar surface of the substrate, the second film stack configured to substantially reflect radiation in the visible to near infrared spectrum and transmit radiation in the infrared spectrum.

2. An infrared filter according to claim 1, wherein:
the first film stack is configured to be at least 70% transmissive to visible to infrared radiation over a range of approximately 450 nm to 820 nm.

3. An infrared filter according to claim 1, wherein:
the substrate is configured to be at least 80% transmissive to visible to near-infrared radiation over a range of approximately 350 nm to 1200 nm.

4. An infrared filter according to claim 1, wherein:
the second film stack is configured to reflect at least 70% of the visible to near-infrared radiation over a range of approximately 450 nm to 820 nm.

5. An infrared filter according to claim 1, wherein:
the second film stack is configured to be least 70% transmissive to infrared radiation over a wavelength range of approximately 880 nm and above.

6. An infrared filter according to claim 1, wherein:
the substrate and first and second film stacks when combined are configured to reflect at least 50% of the light over a wavelength range of $\lambda_o$ to at least $2.3\lambda_o$, such that $\lambda_o$ is the shortest wavelength reflected by the first film stack.

7. An infrared filter according to claim 1, wherein:
at least one of the first and second film stacks further comprises high refractive index layers interleaved with low refractive index layers.

8. An infrared filter as recited in claim 7, wherein:
the high refractive index layers are composed of scandium oxide ($Sc_2O_3$) and the low refractive index layers are composed of silicon dioxide ($SiO_2$).

9. An infrared filter as recited in claim 7, wherein:
the high refractive index layers are composed of magnesium fluoride ($MgF_2$) and the low refractive index layers are composed of aluminum oxide ($Al_2O_3$).

10. An infrared filter as recited in claim 1, wherein:
the substrate is a fused silica substrate.

11. An infrared filter as recited in claim 1, wherein:
each of the first and second film stacks is selected to have a minimum amount of absorption and scatter, whereby radiation transmitted through one of the first and second film stacks maintains at least 70% of intensity of the radiation before transmission.

12. An infrared filter as recited in claim 1, wherein:
each of the first and second film stacks is selected to have a minimum amount of absorption and scatter, whereby radiation reflected by one of the first and second film stacks maintains at least 70% of intensity of the radiation before reflection.

13. An infrared filter as recited in claim 1, wherein:
each layer in the first and second film stacks has a thickness on the order of about a quarter-wave optical thickness.

14. An infrared filter as recited in claim 1, wherein:
at least one of the first and second film stacks includes additional alternating layers of high refractive index material and low refractive index material, wherein:
the high refractive index material is selected from the group consisting of Neodymium Fluoride ($NdF_3$), Gadolinium Fluoride ($GdF_3$), Lanthanum Fluoride ($LaF_3$), Aluminum Oxide ($Al_2O_3$), Praseodymium Fluoride ($PrF_3$) and Thorium Fluoride ($ThF_4$); and
the low refractive index material is selected from the group consisting of Aluminum Fluoride ($AlF_3$), Magnesium Fluoride ($MgF_2$), Silicon Dioxide ($SiO_2$), Lithium Fluoride (LiF), and Cryolite ($Na_3AlF_6$).

15. An infrared filter as recited in claim 1, further comprising:
an aperture positioned to capture radiation reflected from at least one of the first and second film stacks.

16. An infrared filter as recited in claim 1, further comprising:
a beam homogenizer for mixing radiation reflected by the first and second film stacks.

17. An infrared filter as recited in claim 1, further comprising:
a substrate having substantially zero optical power.

18. An infrared filter for an optical metrology tool, the infrared filter comprising:
a substrate;
a first film stack formed on a first surface of the substrate, the first film stack configured to reflect ultra-violet radiation and to transmit visible to infrared radiation; and
a second film stack formed on the second surface of the substrate, the second film stack configured to reflect visible to near infrared radiation and to be transmissive to infrared radiation, whereby the combination of the characteristics of the substrate and film stacks creates a reflectivity of least 70% reflectivity in the ultra-violet to visible range and less than 30% percent in the infrared range.

19. A xenon source infrared blocking filter for an optical metrology tool, comprising:
a substrate being substantially transmissive to radiation in the visible to infrared spectrum;
a first film stack positioned on a first surface of the substrate, the first film stack configured to reflect at least 70% of the radiation having wavelengths in the 220 nm to 440 nm range and transmit at least 70% of the radiation having wavelengths over a range 440 nm to 840 nm; and
a second film stack positioned opposite the first film stack on a second surface of the substrate, the second film stack configured to substantially reflect radiation having wavelengths in the 420 nm to 840 nm range and substantially transmit radiation above 840 nm.

20. A xenon source infrared filter according to claim 19, wherein:
the filter substantially transmits radiation having wavelengths of about 880 nm and above.

21. An infrared filter for substantially removing infrared radiation from a beam of light, the infrared filter including:
a substrate;
a first film stack formed on a first surface of the substrate, the first film stack configured to substantially reflect ultra-violet radiation and to substantially transmit visible to infrared radiation; and
a second film stack formed on the second surface of the substrate, the second film stack configured to substantially reflect visible to near infrared radiation, whereby the combination of the characteristics of the substrate and film stacks creates a reflectivity of least 70% in the ultra-violet to visible range and less than 30% percent in the infrared range.

22. An infrared filter according to claim 21, wherein:
the second film stack is substantially transmissive to infrared radiation.

23. An infrared filter according to claim 21, wherein:
the substrate substantially absorbs infrared light.

24. An infrared filter for an optical metrology tool, comprising:
a substrate being substantially planar and substantially transmissive to radiation in the visible to infrared spectrum;
a first film stack positioned on a first substantially planar surface of the substrate, the first film stack configured to substantially reflect radiation in the ultra-violet spectrum and substantially transmit radiation in the visible to infrared spectrum, said first film stack being configured to be at least 70% transmissive to visible to infrared radiation over a range of approximately 450 nm to 820 nm; and
a second film stack positioned opposite the first film stack on a second substantially planar surface of the substrate, the second film stack configured to substantially reflect radiation in the visible to near infrared spectrum and transmit radiation in the infrared spectrum.

25. An infrared filter for an optical metrology tool, comprising:
a substrate being substantially planar and configured to be at least 80% transmissive to visible to near-infrared radiation over a range of approximately 350 nm to 1200 nm;
a first film stack positioned on a first substantially planar surface of the substrate, the first film stack configured to substantially reflect radiation in the ultra-violet spectrum and substantially transmit radiation in the visible to infrared spectrum; and
a second film stack positioned opposite the first film stack on a second substantially planar surface of the substrate, the second film stack configured to substantially reflect radiation in the visible to near infrared spectrum and transmit radiation in the infrared spectrum.

26. An infrared filter for an optical metrology tool, comprising:
a substrate being substantially planar and substantially transmissive to radiation in the visible to infrared spectrum;
a first film stack positioned on a first substantially planar surface of the substrate, the first film stack configured to substantially reflect radiation in the ultra-violet spectrum and substantially transmit radiation in the visible to infrared spectrum; and a second film stack positioned opposite the first film stack on a second substantially planar surface of the substrate, the second film stack configured to substantially reflect radiation in the visible to near infrared spectrum and transmit radiation in the infrared spectrum, the second film stack being configured to reflect at least 70% of the visible to near-infrared radiation over a range of approximately 450 nm to 820 nm.

27. An infrared filter for an optical metrology tool, comprising:
   a substrate being substantially planar and substantially transmissive to radiation in the visible to infrared spectrum;
   a first film stack positioned on a first substantially planar surface of the substrate, the first film stack configured to substantially reflect radiation in the ultra-violet spectrum and substantially transmit radiation in the visible to infrared spectrum; and
   a second film stack positioned opposite the first film stack on a second substantially planar surface of the substrate, the second film stack configured to substantially reflect radiation in the visible to near infrared spectrum and transmit radiation in the infrared spectrum, the second film stack being configured to be least 70% transmissive to infrared radiation over a wavelength range of approximately 880 nm and above.

28. An infrared filter for an optical metrology tool, comprising:
   a substrate being substantially planar and substantially transmissive to radiation in the visible to infrared spectrum;
   a first film stack positioned on a first substantially planar surface of the substrate, the first film stack configured to substantially reflect radiation in the ultra-violet spectrum and substantially transmit radiation in the visible to infrared spectrum; and
   a second film stack positioned opposite the first film stack on a second substantially planar surface of the substrate, the second film stack configured to substantially reflect radiation in the visible to near infrared spectrum and transmit radiation in the infrared spectrum, arranged such that when the substrate and first and second film stacks are combined are configured to reflect at least 50% of the light over a wavelength range of $\lambda_o$ to at least $2.3\lambda_o$, such that $\lambda_o$ is the shortest wavelength reflected by the first film stack.

* * * * *